United States Patent Office.

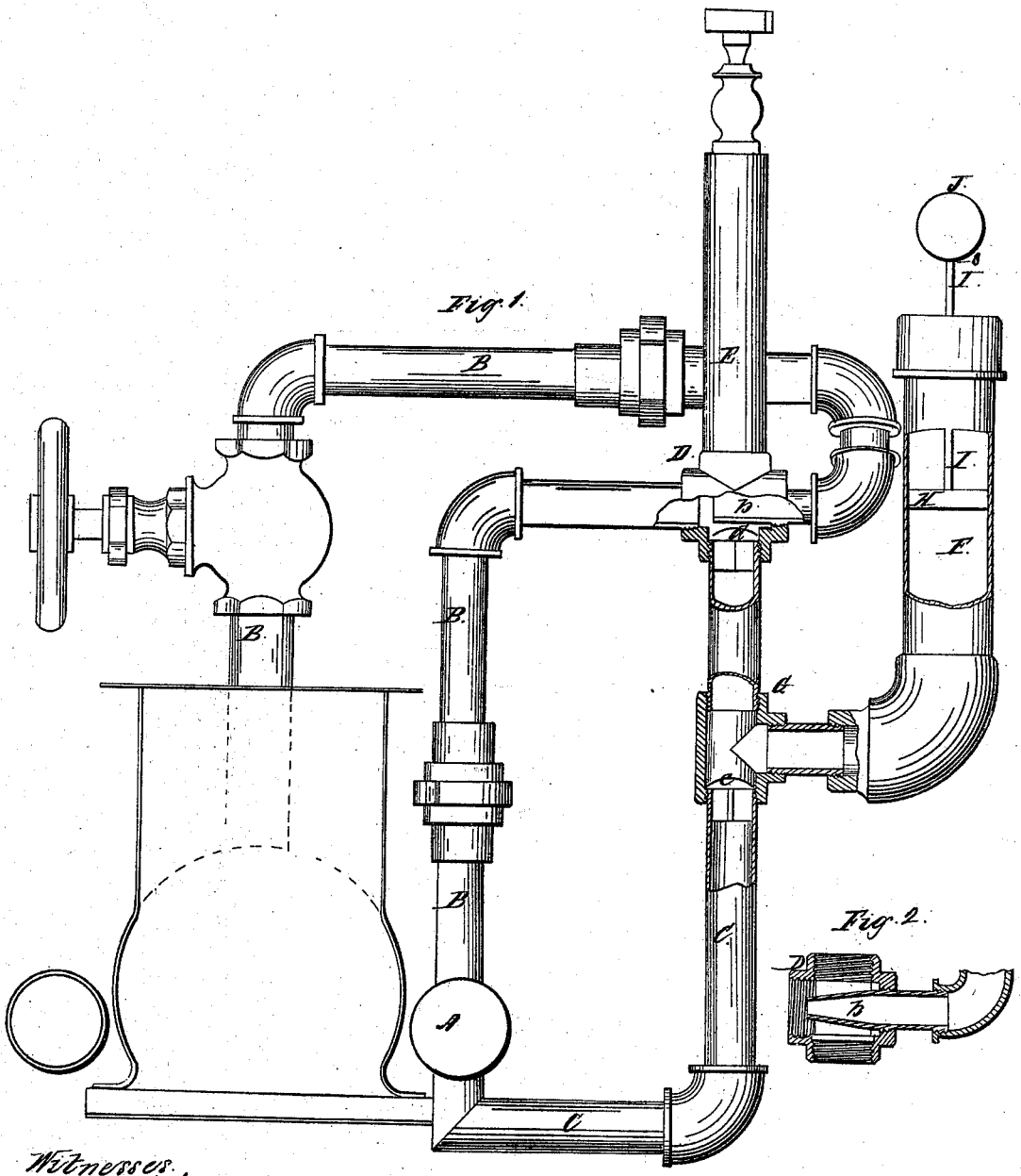

DANIEL LEE, OF BOSTON, MASSACHUSETTS.

Letters Patent No. 90,110, dated May 18, 1869.

IMPROVEMENT IN STEAM-ENGINES.

The Schedule referred to in these Letters Patent and making part of the same.

*To all whom it may concern:*

Be it known that I, DANIEL LEE, of Boston, in the county of Suffolk, and State of Massachusetts, have invented a new and useful Improvement in Steam-Engines; and I do hereby declare that the following is a full, clear, and exact description thereof, reference being had to the accompanying drawings, in which—

Figure 1 represents a general view of my invention, partly in section.

Figure 2 is a sectional view of a modification, hereinafter referred to.

The object of my invention is to economize in the quantity of steam consumed by a steam-engine, by utilizing the whole or a portion of the exhaust-steam, instead of allowing it to escape, thereby economizing in fuel, and reducing the expense of running a steam-engine.

The nature of my invention consists in a combination of devices for taking the steam, as it leaves the exhaust-pipe, and bringing it in communication with the direct current of steam passing from the boiler to the cylinder, in such a manner as to create a current of steam alternately through the front and rear, or upper and lower ends of a cylinder, and the pipes leading to and from it.

To enable others skilled in the art to which my invention appertains, to make and use the same, I will proceed to describe its construction and operation.

In the drawings—

A represents the cylinder of a steam-engine, and

B, the pipe through which steam is conducted to the cylinder from the boiler.

C is a pipe leading from the exhaust, and connecting with the pipe B by a four-way joint, D, as shown.

E is a vacuum-chamber, also connecting with the pipe B by the four-way joint D.

F is a receiving-chamber, connecting with the pipe C by a three-way joint, G.

Within the pipe B is attached, as shown in fig. 1, a short pipe, *b*, the diameter of which is sufficiently less than that of the pipe B to allow a free passage of air and steam around it, and at the same time proportionately increase the velocity of the steam passing through it; or the pipe B may be made tapering in form, as shown in fig. 2, for the same purpose.

The pipe *b*, or the small end of the pipe B, extends a short distance beyond the point of junction of the pipes B and C.

Within the pipe C, near the lower portion of the joint G, is a puppet-valve, *c*, and at the upper end of said pipe C is another puppet-valve, *d*.

Within the receiving-chamber F is a piston, H, to which is attached a tubular rod, I, the lower end of which opens into the chamber F, and on the upper end of which rests a weight, J, provided with a tapering socket, *s*, to receive said upper end.

The operation of my invention is as follows:

The steam is conducted from the boiler, through the pipe B, directly to the cylinder A, the puppet-valve *d* preventing the entrance of any steam into the pipe C from the pipe B.

After acting upon the piston in the cylinder A, the steam is discharged through the exhaust-pipe, passing into the pipe C, and causing the puppet-valves *c* and *d* to rise, and allow the exhaust steam to pass into the vacuum-chamber E and receiving-chamber F.

If the quantity of exhaust steam should be more than sufficient to fill the vacuum-chamber E and receiving-chamber F, after forcing the piston H to the upper end of the chamber, the surplus passes through the tubular rod I, and lifts the weight J, the conical form of the socket *s* allowing it to escape.

The velocity of the steam passing through the pipe *b* creates a vacuum at the point of junction of the pipes B and C, and in the vacuum-chamber E.

When the engine is taking steam, the direct current passes through the pipe B with such strength and rapidity as to take with it the steam in the vacuum-chamber E, lifting the valve *d*, and taking also a portion of the steam from the pipe C, the vacuum thus created being immediately filled from the exhaust-pipe.

When the engine is not taking steam, the pressure of steam in the pipe B and chamber E is sufficient to keep the valve *d* closed, and prevent the escape of any steam by way of the pipe C and chamber F.

When the steam is being exhausted, it passes into the vacuum-chamber E and receiving-chamber F, the surplus escaping by way of the tubular rod I, as hereinbefore described.

When the steam is not being exhausted, the piston H, impelled by the combined action of the weight J and the atmospheric pressure, tends to compress the steam, and force it into the steam-pipe B and vacuum-chamber E.

Any reaction or back pressure of the steam in the chamber F, caused by the operation of the piston H, or from any other cause, is prevented from exerting any influence upon the cylinder or upon the exhaust-steam below the valve *c*, owing to the arrangement and operation of said valve.

I do not confine myself to the use of the ball or weight J, at the upper end of the tubular rod I, but claim the right to use any well-known valve that will accomplish the same purpose equally as well, such, for instance, as a basket-valve, or any of the ordinary forms of safety-valve.

Having thus described my invention,

What I claim as new, and desire to secure by Letters Patent, is—

1. Utilizing the exhaust-steam in a steam-engine, by bringing it in communication with the live steam, and producing a current, by the mechanical devices, substantially as shown and described.

2. The vacuum-chamber E, arranged substantially as specified.

3. The pipe $b$, in combination with the vacuum-chamber E, pipe C, and valves $c$ and $d$, substantially as shown and described.

4. The receiving-chamber F, arranged substantially as specified.

5. The weight J, tubular rod I, and piston H, in combination with the valves $c$ and $d$, substantially as shown and described.

DANIEL LEE.

Witnesses:
 E. R. BROWN,
 M. C. MITCHELL.